Figure 1:
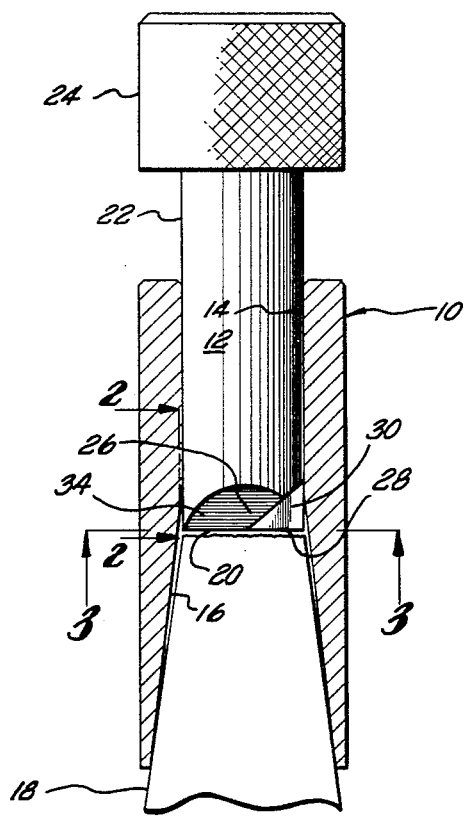

Sept. 22, 1964    V. E. STEPHENS    3,149,534
CUTTING TOOL
Filed April 20, 1962

INVENTOR.
VERNON E. STEPHENS
BY Christie, Parker & Hale
ATTORNEYS.

United States Patent Office 3,149,534
Patented Sept. 22, 1964

3,149,534
CUTTING TOOL
Vernon E. Stephens, 7023 Perry Road,
Bell Gardens, Calif.
Filed Apr. 20, 1962, Ser. No. 189,106
2 Claims. (Cl. 90—12)

This invention relates to cutting tools for reconditioning the ends of flame cutting tips, gas welding tips, electric contact welding tips, soldering tips, and the like. In various types of cutting, welding, and soldering operations, the tips of the equipment used become plugged or damaged and must be restored by a refacing operation, or else must be replaced.

This invention provides a simple and compact tool for quickly refacing tips on the job. Moreover, the tool performs the refacing operation without the need of any pliers, screw drivers, wrenches, or any other auxiliary equipment.

Since the tool is ideally suited for refacing flame cutting and gas welding tips, it is specifically described with respect to that use, although its application for other refacing operations will readily be appreciated by the industry.

Briefly, the cutting tool includes an elongated sleeve having a longitudinal opening extending through it. A portion of the opening adjacent one end of the sleeve is of uniform circular cross section, and the other end of the opening is shaped to make a close fit around the work which is to be refaced. For example, if the work is a flame cutting tip, the end of the sleeve which fits over the cutting tip is tapered to match the taper of the tip so the sleeve seats firmly over the end of the tip to be refaced.

An elongated rod of circular cross section is disposed in the sleeve in the portion of the opening with the uniform circular cross section. The outside diameter of the rod makes a close sliding fit within the sleeve. Means are provided for rotating the rod about its longitudinal axis within the sleeve. Means are also provided for forming a cutting edge on one end of the rod adjacent the work to be cut. The cutting edge of the rod is disposed in a plane substantially perpendicular to the longitudinal axis of the rod so that as the rod is rotated and forced against the work, a flat clean surface is formed on the piece of work.

A typical flame cutting tip is made of copper, and therefore is relatively soft. For such materials, the angle of the cutting edge on the rod is fairly critical. If the angle is too obtuse, insufficient cutting occurs, and if the angle is too sharp, excessive cutting is produced which results in a scalloped or uneven face. Preferably, the surface of the rod should slope away from the cutting edge, i.e., opposite to the direction in which the cutting edge moves, at an angle of between 3° and 13° to the plane through which the cutting edge moves.

The cutting end of the rod preferably includes two cutting edges, which each begin at the center of the rod and extend outwardly to the rod periphery. The cutting edges face in opposite directions so that they both cut as the rod is rotated.

Preferably, the end of the sleeve which fits on the pieces of work is flexible to facilitate firm gripping of the work. In one form, the desired degree of flexibility is obtained by making the sleeve of organic plastic which is firm, yet sufficiently flexible to be deformed slightly when forced over a piece of work. The desired deformation of a sleeve is facilitated by tapering the sleeve to reduced thickness adjacent the end which engages the work.

Figure 2:
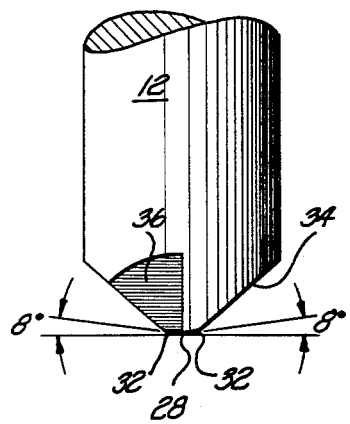

These and other aspects of the invention will be more fully understood from the following detailed description and the accompanying drawings, in which:

FIG. 1 is a longitudinal sectional view of the cutting tool fitted over the end of a flame cutting tip;
FIG. 2 is a view taken on line 2—2 of FIG. 1; and,
FIG. 3 is a view taken on line 3—3 of FIG. 1.

Referring to FIG. 1, an elongated cylindrical sleeve 10 has a uniform outside diameter. A longitudinal opening 12 extends entirely through the sleeve. The upper (as viewed in FIG. 1) portion 14 of the opening is of uniform circular cross section. The lower portion 16 of the opening tapers downwardly and outwardly to the lower end of the sleeve so the thickness of the sleeve wall around its lower portion is considerably less than that of the upper portion. Preferably, the sleeve is made of an organic plastic material such as Nylatron (nylon impregnated with molybdenum disulfide), or Delrin, which is an acetal resin. The tapered portion of the sleeve has a wall thickness of the order of $\frac{1}{64}$ to $\frac{1}{16}$ of an inch so it is slightly flexible and can be forced to make a firm friction grip on the end of a work piece, say a flame cutting tip 18. As shown in FIG. 1, the flame cutting tip has an irregular surface 20 which needs to be trimmed or refaced to a true flat condition. An elongated rod 22 of uniform circular cross section makes a close sliding fit within the portion 14 of the opening through the sleeve, which has a relatively thick wall and therefore provides a rigid bearing support for the rod. Preferably the diameter of the rod is only .0002″ smaller than the bore of the sleeve in which it fits. A knurled knob 24 is secured to the upper end of the rod to provide means for rotating the rod about its longitudinal axis within the sleeve. The rod can also be shifted longitudinally within the sleeve. Cutting means 26 are formed on the lower end of the rod so that as the rod is rotated and pressed into engagement with the tip 18, the surface 20 of the tip is refaced by the cutting means.

Figure 3:
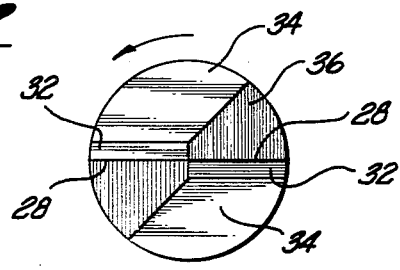

As shown best in FIG. 3, the cutting means include a pair of cutting edges 28, which each begin at the center of the lower end of the rod and extend in diametrically opposite directions to the rod periphery and in a plane perpendicular to the longitudinal axis of the rod. The rod is rotated in a counterclockwise direction (as viewed in FIG. 3) to effect cutting. A flat longitudinal face 30 (FIG. 1) is adjacent each cutting edge 28 and lies in a plane defined by the cutting edges 28 and the longitudinal axis of the rod. A separate trailing surface 32 is adjacent each cutting edge and extends away from its respective cutting edge at an angle of about 8° to a plane perpendicular to the longitudinal axis of the rod (see FIG. 2). For cutting soft material such as copper, this angle is fairly critical and should lie between 3° and 13° for best operation. A first separate relief surface 34 extends at a sharper angle away from each trailing edge of the surface 32, and joins a second respective relief surface 36, which abuts the respective flat surface 28 adjacent each cutting edge.

In using the cutting tool, the tapered end of the sleeve is fitted over the piece of work to be refaced until the sleeve grips the work tightly (as shown in FIG. 1). The cutting end of the rod is then inserted in the opposite end of the sleeve until the cutting means engages the surface to be refaced. Thereafter, the rod is rotated in the direction indicated by the arrow shown in FIG. 3 and forced into engagement with the surface to be refaced. The cutting edges cleanly cut away excess or irregular material to provide a clean flat surface on the piece of work normal to the axis of rotation of the rod.

From the foregoing, it will be apparent that the tool of the invention restores damaged tips to new tip performance in one simple operation. There is no need to remove the tip from its torch or other equipment, and there is no need for manipulating tools such as wrenches, pliers, screw drivers, etc. For most operations, the tool is only about 2 inches long and about $\frac{5}{8}$ inch in diameter. Because of its convenient size, it is easily carried in a worker's pocket and, therefore, eliminates costly toolroom maintenance.

I claim:

1. A cutting tool comprising an elongated sleeve having a longitudinal opening extending through it, a portion of the opening adjacent one end of the sleeve being of uniform circular cross section, the wall thickness of the sleeve at the other end being less than at the said one end and sufficiently thin for the sleeve to be flexible at the said other end, an elongated rod disposed in the sleeve in the portion of the opening with the uniform circular cross section, the rod having a circular cross section to make a close sliding fit within the said portion of the opening, means rotating the rod about its longitudinal axis within the sleeve, and means forming a cutting edge on one end of the rod, the cutting edge being in a plane substantially perpendicular to the longitudinal axis of the rod.

2. A cutting tool comprising an elongated plastic sleeve having a longitudinal opening extending through it, a portion of the opening adjacent one end of the sleeve being of uniform circular cross section, the wall thickness of the sleeve at the other end being sufficiently thin for the sleeve to be flexible at the said other end, an elongated rod disposed in the sleeve in the portion of the opening with the uniform cross section, the rod having a circular cross section to make a close sliding fit within the said portion of the opening, means for rotating the rod about its longitudinal axis within the sleeve, and means forming a cutting edge on one end of the rod, the cutting edge being in a plane substantially perpendicular to the longitudinal axis of the rod.

References Cited in the file of this patent

UNITED STATES PATENTS

| | | |
|---|---|---|
| 455,101 | Heydenreich | June 30, 1891 |
| 1,093,252 | Carnes | Apr. 14, 1914 |
| 1,476,019 | Lowry | Dec. 4, 1923 |
| 1,927,463 | McIntosh | Sept. 19, 1933 |
| 2,525,828 | Rice | Oct. 17, 1950 |

FOREIGN PATENTS

| | | |
|---|---|---|
| 154,242 | Germany | Sept. 10, 1904 |